US012795603B2

(12) United States Patent
Gandikota et al.

(10) Patent No.: US 12,795,603 B2
(45) Date of Patent: Nov. 10, 2026

(54) METHODS AND APPARATUS FOR HANDLING MUSIM PER ACCESS

(71) Applicant: Samsung Electronics Co., Ltd., Suwon-si (KR)

(72) Inventors: Jagadeesh Gandikota, Bangalore (IN); Lalith Kumar, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 18/293,105

(22) PCT Filed: Aug. 10, 2022

(86) PCT No.: PCT/KR2022/011920
§ 371 (c)(1),
(2) Date: Jan. 29, 2024

(87) PCT Pub. No.: WO2023/018220
PCT Pub. Date: Feb. 16, 2023

(65) Prior Publication Data

US 2025/0081159 A1 Mar. 6, 2025

(30) Foreign Application Priority Data

Aug. 10, 2021 (IN) ............................ 202141036098
Aug. 1, 2022 (IN) ............................ 2021 41036098

(51) Int. Cl.
*H04W 68/02* (2009.01)
*H04W 4/50* (2018.01)
(Continued)

(52) U.S. Cl.
CPC ............ *H04W 68/02* (2013.01); *H04W 4/50* (2018.02); *H04W 76/30* (2018.02); *H04W 88/06* (2013.01)

(58) Field of Classification Search
None
See application file for complete search history.

(56) References Cited

U.S. PATENT DOCUMENTS

2019/0394711 A1* 12/2019 Kim ...................... H04W 76/25
2020/0008264 A1* 1/2020 Kang ................ H04W 36/0033
(Continued)

FOREIGN PATENT DOCUMENTS

EP 3 499 838 A1 6/2019
WO 2018/236819 A1 12/2018
WO 2021/066562 A1 4/2021

OTHER PUBLICATIONS

3GPP TS 23.501 V17.1.0, 3rd Generation Partnership Project; Technical Specification Group Services and System Aspects; System architecture for the 5G System (5GS); Stage 2, (Release 17), Jun. 24, 2021.
(Continued)

*Primary Examiner* — San Htun
(74) *Attorney, Agent, or Firm* — Jefferson IP Law, LLP

(57) ABSTRACT

The disclosure relates to 5G or 6G communication system for supporting a higher data transmission rate. In an embodiment, a method includes deciding to use 3GPP access or non-3GPP access; and based on the decision, transmitting a service request message or a registration request message to an access and mobility management function (AMF) over the 3GPP access or the non-3GPP access, wherein in case that paging restriction information is not included in the service request message or the registration request message transmitted over the 3GPP access, stored paging restriction information regarding context of the UE is removed at the AMF.

8 Claims, 3 Drawing Sheets

(51) Int. Cl.
*H04W 76/30* (2018.01)
*H04W 88/06* (2009.01)

(56) References Cited

U.S. PATENT DOCUMENTS

| | | | | |
|---|---|---|---|---|
| 2020/0053830 | A1* | 2/2020 | Venkataraman | H04W 68/12 |
| 2020/0120585 | A1* | 4/2020 | Kumar | H04W 36/0033 |
| 2020/0187081 | A1 | 6/2020 | Roy et al. | |
| 2021/0136849 | A1* | 5/2021 | Nimmala | H04W 68/005 |
| 2022/0053448 | A1* | 2/2022 | Velev | H04W 60/005 |
| 2022/0272660 | A1* | 8/2022 | Luetzenkirchen | H04W 76/30 |
| 2024/0098700 | A1* | 3/2024 | Ke | H04W 76/30 |

OTHER PUBLICATIONS

Indian Office Action dated Jul. 19, 2023, issued in Indian Patent Application No. 202141036098.

3GPP TS 23.502 V17.1.0, 3rd Generation Partnership Project; Technical Specification Group Services and System Aspects; Procedures for the 5G System (5GS); Stage 2, (Release 17), Jun. 24, 2021.

International Search Report and Written Opinion dated Nov. 14, 2022, issued in International Patent Application No. PCT/KR2022/011920.

* cited by examiner

[Fig. 1]
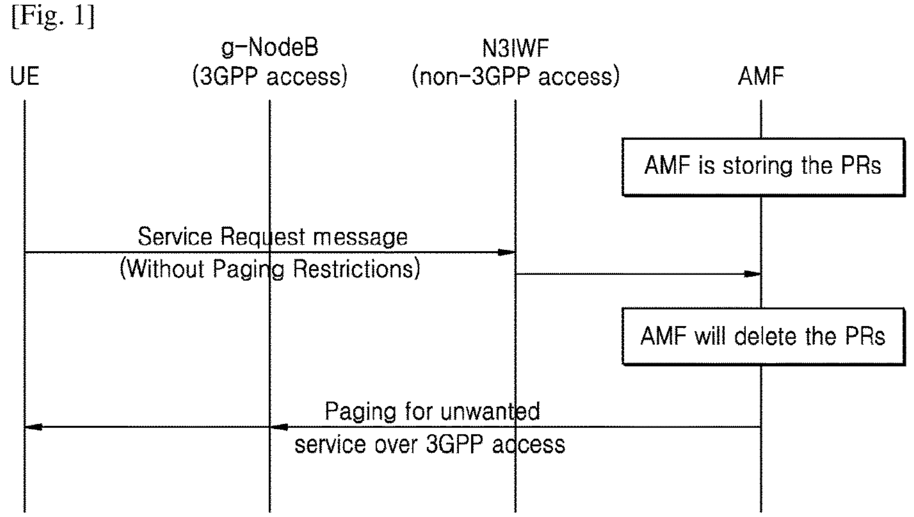
[Fig. 2]
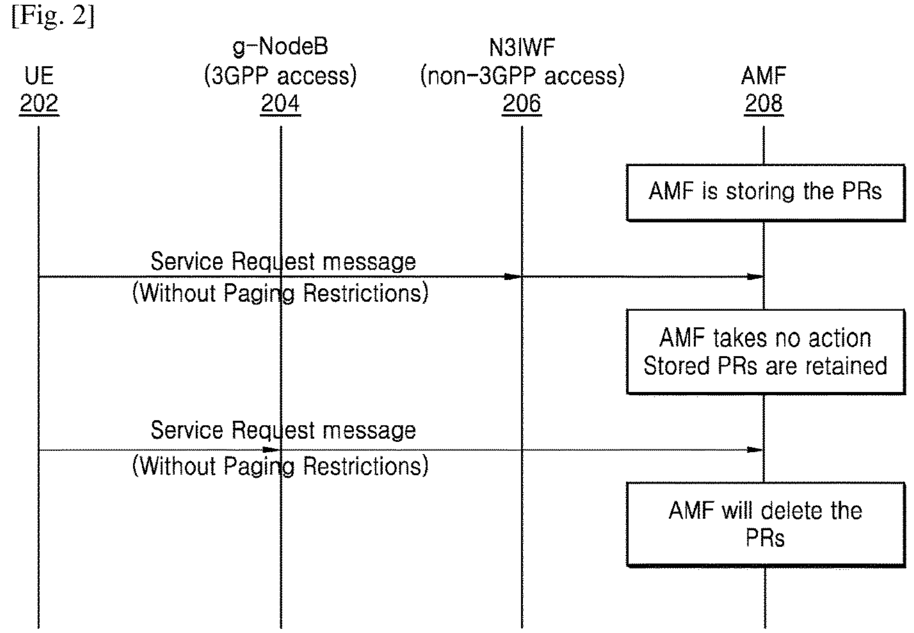
[Fig. 3]
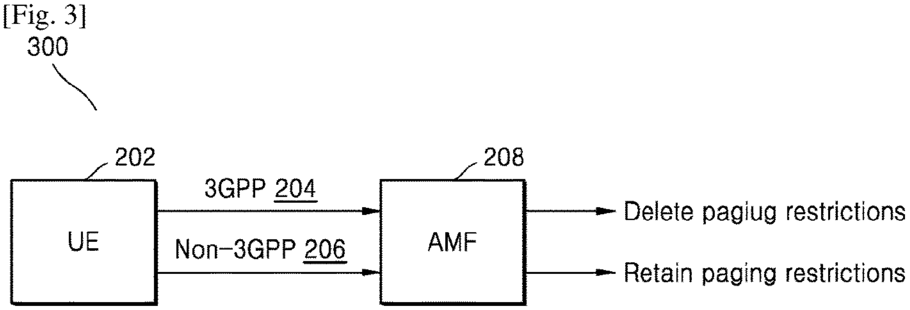
[Fig. 4]
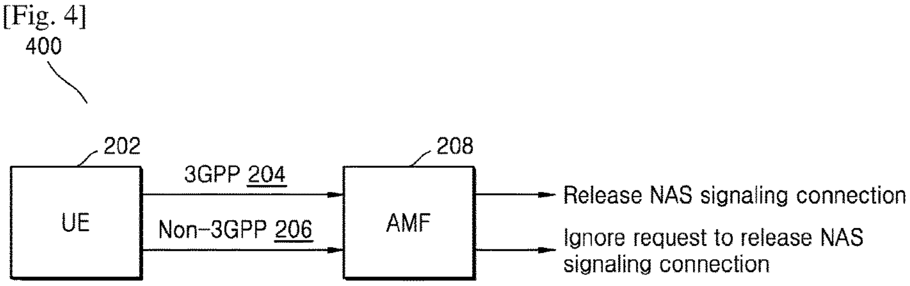

[Fig. 5]
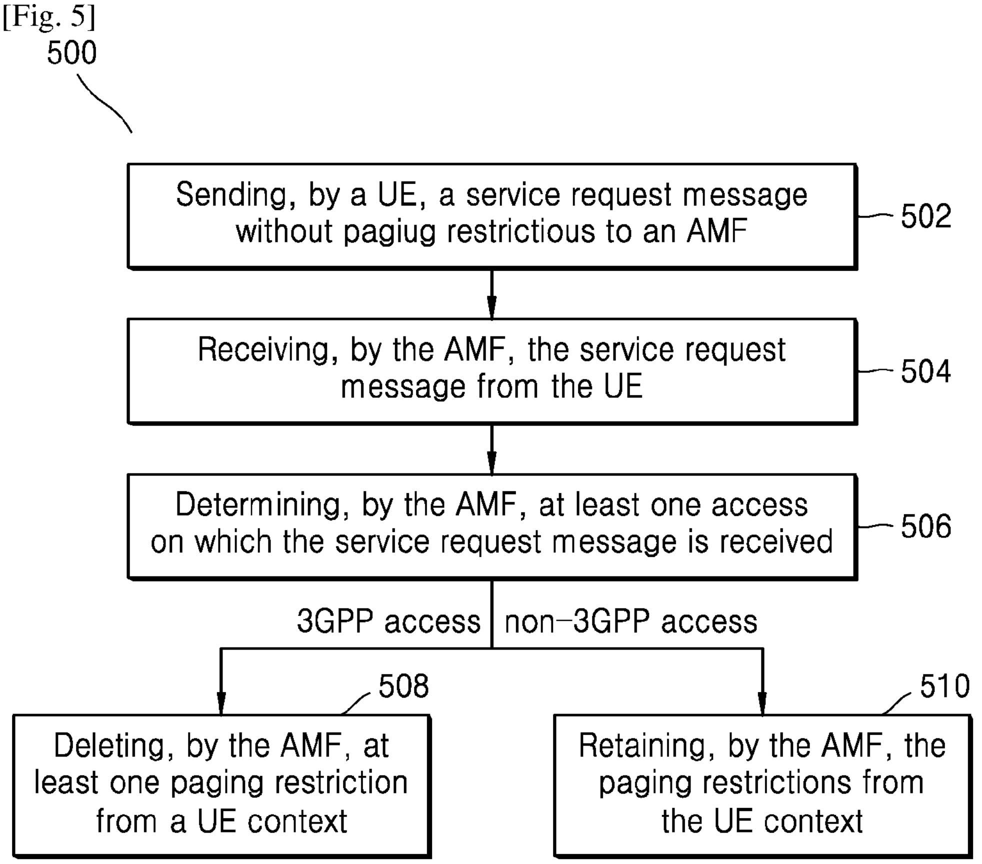
[Fig. 6]
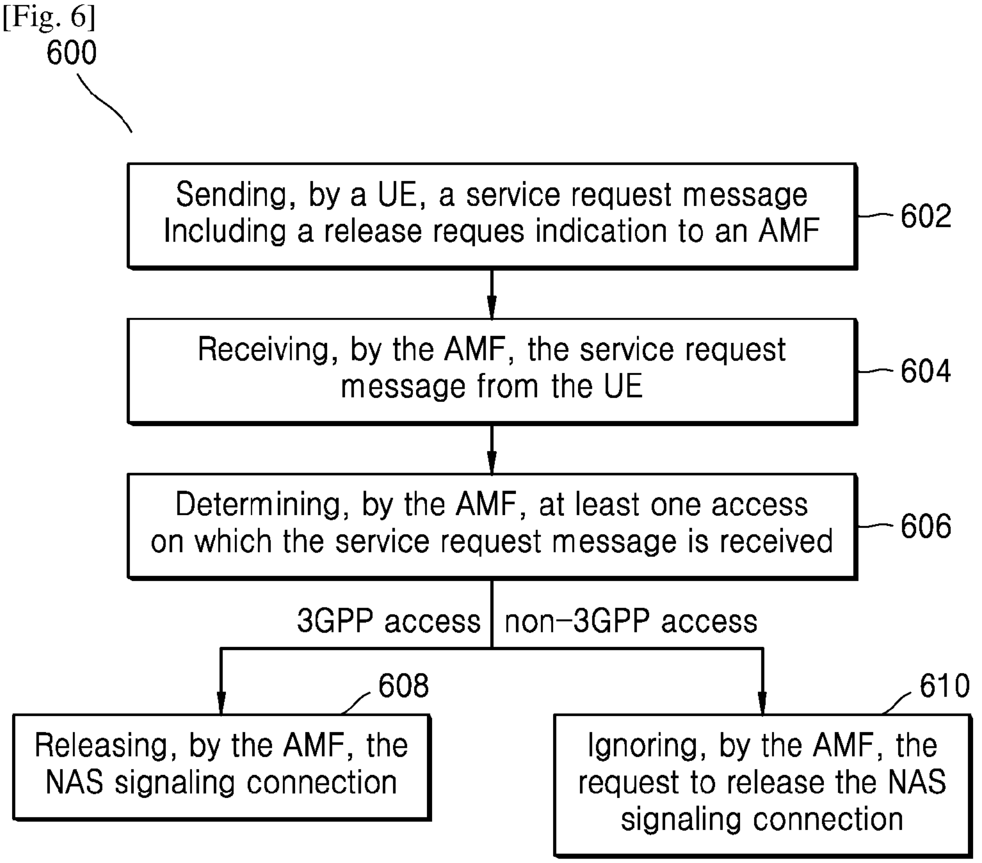

[Fig. 7]
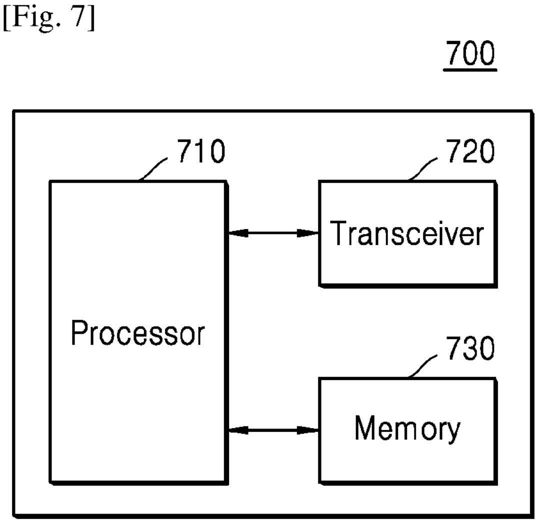
[Fig. 8]
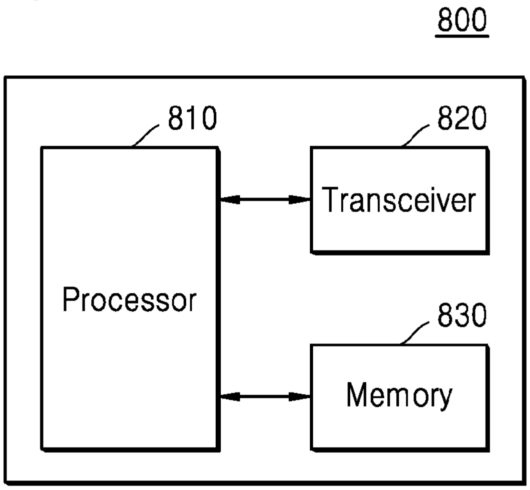

METHODS AND APPARATUS FOR HANDLING MUSIM PER ACCESS

TECHNICAL FIELD

Embodiments disclosed herein relate to multi-USIM (User Services Identity Module (USIM)) User Equipments (UEs) in wireless communication networks, and more particularly for handling multi-USIM per access in wireless communication networks.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

DISCLOSURE OF INVENTION

Technical Problem

A Multi-USIM UE is a UE with multiple USIMs, capable of maintaining a separate registration state with a PLMN for each USIM at least over 3GPP Access and supporting one or more of the enhancements described in 3GPP.

A network and a UE may support one or more of the following enhancements for Multi-USIM UE operation:

Connection release;

Paging indication for voice service;

Reject paging request;

Paging Restrictions (PRs).

In the Registration procedure, a Multi-USIM UE may include the Multi-USIM Mode Indication to the Access and Mobility Management Function (AMF), if it has more than one USIM active and intends to use Multi-USIM specific features. Based on the received Multi-USIM Mode Indication (or the capability) from the UE, the AMF shall indicate to the UE the Multi-USIM features supported by the network.

Connection Release:

When accessing core network, a Multi-USIM UE may request the network to be released from CM-CONNECTED state due to activity on another USIM. The UE requests to be released from the CM-CONNECTED state, by initiating either a Service Request procedure or a Registration procedure (in case, the UE needs to perform Registration Update at the same time with this network), including a Release Indication. If supported by the UE, the UE may also provide, a Paging Restriction Information with the Release Indication, which requests the network to restrict paging. The Paging Restriction Information from the UE is stored in the UE context in the AMF. If no Paging Restriction Information is provided in the Service Request or the Registration Request, any stored Paging Restriction Information in the UE context is removed. When the UE initiates a Service Request procedure or Registration procedure without providing a Release Indication (also called as release request indication), the network removes any stored Paging Restriction Information.

Paging Restriction:

The UE and the network may support Paging Restriction. The UE, if the AMF indicates that the network supports Paging Restriction feature, may indicate Paging Restriction Information in the Service Request or Registration Request message. The Paging Restriction Information (PRs) may indicate any of the following:

a) all paging is restricted; or
b) all paging is restricted, except paging for voice service (IMS voice); or
c) all paging is restricted, except for certain PDU Session (s); or
d) all paging is restricted, except paging for voice service (IMS voice) and certain PDU session(s).

FIG. 1 discloses an example scenario, related to paging restrictions. The AMF or any other network function (NF) has stored PRs, or the paging restrictions set of the UE in the UE context. The UE sends a service request message (or registration request message) over a non-3GPP access to the AMF for any of the existing triggers; for example, on receiving an indication from the lower layers of non-3GPP access, that the access stratum connection has been established between the UE and the network, the UE in 5GMM-REGISTERED state and in 5GMM-IDLE mode over non-3GPP access shall initiate the service request procedure via non-3GPP access, i.e., the UE gets into the service area of the non-3GPP access. When the service request message without PRs is received at the AMF, the AMF will end up deleting PRs, i.e., the network removes any stored Paging Restriction Information (PRs). Because the stored paging restriction information is deleted at the AMF, the AMF will page the UE when downlink data is received; hereby wasting paging resources. Further, the UE, assuming the paging is for set paging filters, will respond to the paging, and execute a NAS procedure over 3GPP access to get into the connected mode, only to realize the incoming service is of low priority. The UE will perform a local release and switch to the second SIM for priority service(s), which can waste the network resources as well as service on the second SIM. Thus, there is a need for a mechanism to decouple the 3GPP access and non-3GPP access procedure so that paging restrictions are set or deleted in the network when the UE wishes to do the same.

Further, when the UE sends a service request with release request indication to the AMF, the AMF initiates for access network (AN) release procedure. However, from the service request, it is not clear through which access the AN release procedure shall be initiated. For example, if the UE sends the service request and the release request indication, the AMF may trigger the AN release procedure over a 3GPP access, a non-3GPP access or both the accesses. This can lead to interoperability issues. Since, the UE does not mention on which access the releasing of NAS signalling connection is requested, the UE may expect to receive the signalling connection release for 3GPP access. However, the UE receives the signalling connection release for the non-3GPP access, then there may be a delay in the UE switching to another SIM. Therefore, the UE needs to re-trigger the service request and release request indication and as only one access is active at the AMF, the AMF or network may trigger the AN release for 3GPP access. However, this two-step execution can delay the UEs intention of switching to the second SIM. Thus, there is a need for an exact standard protocol on: a) How the UE has to request the AN release procedure for a particular access the UE is interested into; and b) How the AMF determines which access it has to release based on the UE request.

Solution to Problem

The principal object of the embodiments herein is to disclose methods and systems for handling multi-USIM (User Services Identity Module (USIM)) per access in wireless communication networks.

Another object of the embodiments herein is to disclose systems and methods for deleting paging restrictions from a UE context, when a service request message without paging restrictions is received over a 3GPP access.

Another object of the embodiments herein is to disclose systems and methods for retaining the paging restrictions from the UE context, when a service request message without paging restrictions is received over a non-3GPP access.

Another object of the embodiments herein is to disclose systems and methods for releasing a NAS signaling connection, when a service request message including a release request indication is received over a 3GPP access.

Another object of the embodiments herein is to disclose systems and methods for ignoring the request to release the NAS signaling connection, when a service request message including a release request indication is received over a non-3GPP access.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Accordingly, the embodiments herein provide methods and systems for handling multi-USIM (User Services Identity Module (USIM)) per access.

Accordingly, the embodiments herein provide a method for managing paging restrictions on a network. The method discloses receiving, by an access and mobility management function (AMF), a service request message without paging restrictions from a user equipment (UE). Subsequently, the method discloses determining, by the AMF, at least one access on which the service request message is received. Thereafter, the method discloses deleting or retaining, by the AMF, at least one paging restriction from a UE context based on the determination of the access.

The AMF deletes the paging restriction from the UE context in response to the determination that the service request message is received over a 3GPP access. The AMF retains the paging restriction from the UE context in response to the determination that the service request message is received over a non-3GPP access. The AMF applies the paging restriction for both the 3GPP access and the non-3GPP access.

Accordingly, the embodiments herein provide a system for managing paging restrictions on a network. The system comprises at least one UE which is configured for sending a service request message without paging restrictions to an AMF. The AMF is configured for receiving the service request message from the AMF, determining an access on which the service request message is received, and deleting or retaining the paging restriction from a UE context based on the determination of the access.

Accordingly, the embodiments herein provide a method for managing a NAS signaling connection release on a network. The method discloses receiving, by the AMF, a service request message including a release request indication from a UE. Subsequently, the method discloses determining, by the AMF, an access on which the service request message is received. Thereafter. the method discloses releasing, by the AMF, the NAS signaling connection or ignoring the request to release the NAS signaling connection based on the determination of the access.

The AMF releases the NAS signaling connection over 3GPP access in response to the determination that the service request message is received over a 3GPP access. The AMF ignores the request to release the NAS signaling connection in response to the determination that the service request message is received over a non-3GPP access.

Accordingly, the embodiments herein provide a system for managing a NAS signaling connection release on a network. The system comprises at least one UE which is configured for sending a service request message including a release request indication to an AMF. The AMF is configured for receiving the service request message from the UE, determining an access on which the service request message is received, and releasing the NAS signaling connection or ignoring the request to release the NAS signaling connection based on the determination of the access.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 1 discloses an example scenario, related to paging restrictions, according to prior arts;

FIG. 2 discloses an example scenario, related to paging restrictions, according to embodiments as disclosed herein;

FIG. 3 depicts a system for managing paging restrictions on a network, according to embodiments as disclosed herein;

FIG. 4 depicts a system for managing a NAS signaling connection release on a network, according to embodiments as disclosed herein;

FIG. 5 depicts a method for managing paging restrictions on a network, according to embodiments as disclosed herein; and FIG. 6 depicts a method for managing a NAS signaling connection release on a network, according to embodiments as disclosed herein.

FIG. 7 is a block diagram of a user equipment, according to an embodiment of the disclosure.

FIG. 8 is a block diagram of network entity, according to an embodiment of the disclosure.

BEST MODE FOR CARRYING OUT THE INVENTION

In one embodiment, a user equipment (UE) in a wireless communication is provided. The UE comprising: a transceiver; and a processor coupled with the transceiver and configured to: decide to use 3GPP access or non-3GPP access, and based on the decision, transmit a service request message or a registration request message to an access and mobility management function (AMF) over the 3GPP access or the non-3GPP access, wherein in case that paging restriction information is not included in the service request message or the registration request message transmitted over the 3GPP access, stored paging restriction information regarding context of the UE is removed at the AMF.

In one embodiment, the processer of the UE is further configured to: in case that the service request message or the registration request message is transmitted over the non-3GPP access, the stored paging restriction information regarding the context of the UE is retained at the AMF.

In one embodiment, an access and mobility management function (AMF) in a wireless communication is provided. The AMF comprising: a transceiver; and a processor coupled with the transceiver and configured to: receive a service request message or a registration request message from a user equipment (UE), and in case that paging restriction information is not included in the service request message or the registration request message received over 3GPP access, remove stored paging restriction information regarding context of the UE.

In one embodiment, the processer of the AMF is further configured to: in case that the service request message or the registration request message is received over non-3GPP access, retain the stored paging restriction information regarding the context of the UE.

In one embodiment, a user equipment (UE) in a wireless communication is provided. The UE comprising: a transceiver; and a processor coupled with the transceiver and configured to: perform operation on a radio resource control (RRC) connected state, and initiate service request procedure or registration request procedure to be released from the RRC connected state by transmitting a service request message or a registration request message including a release indication to access and mobility management function (AMF) over 3GPP access, wherein based on the service request message including the release indication over the 3GPP access, access network (AN) release procedure is triggered, and based on the registration request message including the release indication over the 3GPP access, the AN release procedure is triggered after completion of the registration procedure.

In one embodiment, the processer of the UE is further configured to: in case that the service request message or the registration request message including the release indication is transmitted over non-3GPP access, the release indication in the service request message or the registration request message is ignored at the AMF.

In one embodiment, an access and mobility management function (AMF) in a wireless communication is provided. The AMF comprising: a transceiver; and a processor coupled with the transceiver and configured to: receive a service request message or a registration request message including a release indication from a user equipment (UE) to be released from a radio resource control (RRC) connected state over 3GPP access, based on the service request message including the release indication over the 3GPP access, trigger access network (AN) release procedure, and based on the registration request message including the release indication over the 3GPP access, trigger the AN release procedure after completion of the registration procedure.

In one embodiment, the processer of the AMF is further configured to: in case that the service request message or the registration request message including the release indication is received over non-3GPP access, ignore the release indication in the service request message or the registration request message.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods and systems for handling multi-USIM (User Services Identity Module (USIM)) per access in wireless communication networks. Referring now to the drawings, and more particularly to FIGS. 2 through 6, where similar reference characters denote corresponding features consistently throughout the figures, there are shown at least one embodiment.

Embodiments disclosed herein are applicable to UE initiated NAS procedures. Embodiments herein have been explained using a NAS message, service request message merely as an example of a UE initiated NAS procedure, and it may be obvious to a person of ordinary skill in the art that the embodiments herein may be extended to all UE initiated NAS procedures.

Embodiments disclosed herein are applicable to EPS case core network nodes. Embodiments herein have been explained from the perspective of 5GS as an example of a EPS core network node, however it may be obvious to a person of ordinary skill in the art that the embodiments herein may be equally applicable for EPS case core network nodes (MME, AMF, and so on).

FIG. 2 discloses an example scenario, related to paging restrictions. When the UE 202 initiates a Service Request procedure over 3GPP access 204 or Registration procedure over 3GPP access 204 without providing a Release Indication, the network removes any stored Paging Restriction Information.

When the UE 202 initiates a Service Request procedure over non-3GPP access 206 or Registration procedure over non-3GPP access 206 without providing a Release Indication, the network (e.g., AMF 208) retains the stored Paging Restriction Information and executes the Service Request procedure without deleting or impacting the paging restrictions.

The UE 202 can request to be released from the RRC-CONNECTED state, by initiating a Service Request procedure over 3GPP access 204, wherein the Service Request procedure includes a Release Indication. The network will initiate for access network (AN) release procedure over 3GPP access and releases the NAS signalling connection over 3GPP access.

If the UE 202 needs to perform Registration Update at the same time with this network, the UE 202 can request to be released from the RRC-CONNECTED state, by initiating a Registration procedure over 3GPP access 204, wherein the request includes a Release Indication. On completion of the registration procedure, the network will initiate for access network (AN) release procedure over 3GPP access and releases the NAS signalling connection over 3GPP access.

The UE 202 requests to be released from RRC-CONNECTED state, by initiating a Service Request procedure over non-3GPP access 206, wherein the Service Request procedure includes a Release Indication. The network (e.g., AMF 208) retains and takes no action on the stored Paging Restriction Information and ignores the received Release Indication. The network (e.g., AMF 208) does not initiate the AN release procedure over non-3GPP access and does not release the NAS signalling connection over non-3GPP access.

If the UE 202 needs to perform Registration Update at the same time with this network, the UE 202 requests to be released from the RRC-CONNECTED state, by initiating a Registration procedure over non-3GPP access 206, wherein the request includes a Release Indication. The network (e.g., AMF 208) retains the stored Paging Restriction Information and takes no action on the stored Paging Restriction Information. The network (e.g., AMF 208) ignores the Release Indication, and does not initiate the AN release procedure and does not release the NAS signalling connection.

If no Paging Restriction Information is provided (i.e. not included) in the Service Request message sent over 3GPP access 204 or the Registration Request message sent over 3GPP access 204, any stored Paging Restriction Information in the UE context is removed by the AMF 208.

The UE 202 does not provide (i.e. include) paging registration in the service request message while sending over non-3GPP access. If no Paging Restriction Information is provided in the Service Request over non-3GPP access 206 or the Registration Request over non-3GPP access 206, the network (e.g. AMF 208) retains any stored Paging Restriction Information in the UE context and the network (e.g. AMF 208) takes no action on the stored Paging Restriction Information i.e., the network does not delete the PRs.

The stored paging restriction information can be applicable to both 3GPP access 204 and non-3GPP access 206, since the downlink data or signalling network can send the paging message to the UE 202 over the 3GPP access or the network can send the NOTIFICATION MESSAGE to the UE 202 over non-3gpp access to get the UE 202 into connected state over 3gpp access. Depending on the paging restrictions, the network should determine whether the network has to send or not to send the NOTIFICATION message over non-3GPP access or Paging message over 3GPP access.

FIG. 3 depicts a system 300 for managing paging restrictions on a network. The system 300 comprises a user equipment (UE) 202, and an access and mobility management function (AMF) 208. The system 300 herein depicts AMF 208 as an example, however, other network components can be utilized.

In an embodiment, the UE 202 can send a service request message without paging restrictions to the AMF 208.

In an embodiment, the AMF 208 can receive the service request message from the UE 202, and determine at least one access on which the service request message is received. The AMF 208 can delete or retain at least one paging restriction from a UE context based on the determined access on which the service request message has been received.

For example, if the AMF 208 determines that the service request message has been received over a 3GPP access 204, the AMF 208 deletes the PRs from the UE context. Therefore, the service request message without PRs over the 3GPP access 204 indicates the AMF 208 to delete the PRs. Thus, the UE 202 initiates the service request message only on 3GPP access 204 to delete the PRs.

If the AMF 208 determines that the service request message has been received over a non-3GPP access 206, the AMF 208 retains the paging restrictions from the UE context. Therefore, the service request message without paging restrictions over the non-3GPP access 206 indicates the AMF 208 to not delete the PRs and continue to store the PRs in the UE context. The UE will also not include paging restrictions in NAS message like service request message or registration request message over non-3gpp access.

The AMF 208 applies the PRs for both the 3GPP access 204 and the non-3GPP access 206.

FIG. 4 depicts a system 400 for managing a NAS signaling connection release on a network.

In an embodiment, the UE 202 can send a service request message including a release request indication to the AMF 208.

In the NAS message like service request or registration request message as part of UE request type information element (IE) setting Request type to "NAS signaling connection release" is same as setting/including/indicating release request indication as discussed in this embodiment.

In an embodiment, the AMF 208 can receive the service request message from the UE 202 and determine at least one access on which the service request message is received. The AMF 208 can release the NAS signaling connection or ignore the request to release the NAS signaling connection based on the determination of the at least one access.

For example, if the AMF 208 determines that the service request message is received over a 3GPP access 204, then the AMF 304 releases the NAS signaling connection. If the AMF 208 determines that the service request message is received over a non-3GPP access 206, then the AMF 208 ignores the request to release the NAS signaling connection.

FIG. 5 depicts a method 500 for managing paging restrictions on a network. The method 500 begins with sending, by the UE 202, a service request message without paging restrictions to an AMF, as depicted in step 502. Subsequently, the method 500 discloses receiving, by the AMF, the service request message from the UE 202, as depicted in step 504. Thereafter, the method 500 discloses determining, by the AMF, at least one access on which the service request message is received, as depicted in step 506.

The method 500 discloses deleting, by the AMF, at least one paging restriction from a UE context on determining the access as 3GPP, as depicted in step 508. The method 500 discloses retaining, by the AMF, the paging restrictions from the UE context on determining the access as non-3GPP, as depicted in step 510. The various actions in method 500 may be performed in the order presented, in a different order or simultaneously. Further, in some embodiments, some actions listed in FIG. 5 may be omitted.

FIG. 6 depicts a method 600 for managing a NAS signaling connection release on a network. The method 600 begins with sending, by the UE, a service request message including a release request indication to an AMF, as depicted in step 602. Subsequently, the method 600 discloses receiving, by the AMF, the service request message from the UE, as depicted in step 604. Thereafter, the method 600 discloses determining, by the AMF, at least one access on which the service request message is received, as depicted in step 606.

The method 600 discloses releasing, by the AMF, the NAS signaling connection on determining the access as 3GPP, as depicted in step 608. Otherwise, the method 600 discloses ignoring, by the AMF, the request to release the NAS signaling connection on determining the access as non-3GPP, as depicted in step 610.

FIG. 7 is a diagram illustrating a UE 700 according to another embodiment of the present disclosure.

Referring to the FIG. 7, the UE 700 may include a processor 710, a transceiver 720 and a memory 730. However, all of the illustrated components are not essential. The UE 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the UE 700 aforementioned in this disclosure may be implemented by the processor 710.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the UE 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

FIG. 8 is a diagram illustrating a network entity 800 according to another embodiment of the present disclosure.

Referring to the FIG. 8, the network entity 800 may include a processor 810, a transceiver 820 and a memory 830. However, all of the illustrated components are not essential. The network entity 800 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the proposed function, process, and/or method. Operation of the AMF in this disclosure may be implemented by the processor 810.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the network entity 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CDROM and/or DVD and/or other storage devices.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A user equipment (UE), in a wireless communication system, the UE comprising:
- at least one transceiver;
- at least one processor communicatively coupled with the at least one transceiver; and
- at least one memory, communicatively coupled to the at least one processor, storing instructions executable by the at least one processor to cause the UE to:
  - transmit a service request message or a registration request message to an access and mobility management function (AMF) over 3GPP access or non-3GPP access, wherein the service request message or the registration request message does not include paging restriction information,
- wherein, in case that the service request message without the paging restriction information or the registration request message without the paging restriction information is transmitted over the 3GPP access, stored paging restriction information regarding context of the UE is removed at the AMF, and
- wherein, in case that the service request message without the paging restriction information or the registration request message without the paging restriction information is transmitted over the non-3GPP access, the stored paging restriction information regarding the context of the UE is retained at the AMF.

2. An access and mobility management function (AMF), in a wireless communication system, the AMF comprising:
- at least one transceiver;
- at least one processor communicatively coupled with the at least one transceiver; and
- at least one memory, communicatively coupled to the at least one processor, storing instructions executable by the at least one processor to cause the AMF to:
  - receive a service request message or a registration request message from a user equipment (UE) over 3GPP access or non-3GPP access, wherein the service request message or the registration request message does not include paging restriction information, and
  - in case that the service request message without the paging restriction information or the registration request message without the paging restriction information is received over the 3GPP access, remove stored paging restriction information regarding context of the UE, and
  - in case that the service request message without the paging restriction information or the registration request message without the paging restriction information is received over the non-3GPP access, retain the stored paging restriction information regarding the context of the UE.

3. A user equipment (UE); in a wireless communication system, the UE comprising:
- at least one transceiver;
- at least one processor communicatively coupled with the at least one transceiver; and
- at least one memory, communicatively coupled to the at least one processor, storing instructions executable by the at least one processor to cause the UE to:
  - transmitting a service request message or a registration request message to release from a radio resource control (RRC)-CONNECTED state to an access and mobility management function (AMF) over 3GPP access or non-3GPP access, wherein the service request message or the registration request message includes a release indication,
  - wherein in case that the service request message including the release indication is transmitted over the 3GPP access, access network (AN) release procedure is triggered, and
  - wherein, in case that the registration request message including the release indication is transmitted over the 3GPP access, the AN release procedure is triggered after completion of a registration procedure, and
  - wherein, in case that the service request message or the registration request message including the release indication is transmitted over the non-3GPP access, the release indication in the service request message or the registration request message is ignored at the AMF.

4. An access and mobility management function (AMF) in a wireless communication system, the AMF comprising:

at least one transceiver;

at least one processor communicatively coupled with the at least one transceiver; and at least one memory, communicatively coupled to the at least one processor, storing instructions executable by the at least one processor to cause the AMF to:

receive a service request message or a registration request message to release from a radio resource control (RRC)-CONNECTED state from a user equipment (UE) over 3GPP access or non-3GPP access, wherein the service request message or the registration request message includes a release indication, in case that the service request message including the release indication is received over the 3GPP access, trigger access network (AN) release procedure, in case that the registration request message including the release indication is received over the 3GPP access, trigger the AN release procedure after completion of a registration procedure, and in case that the service request message or the registration request message including the release indication is received over the non-3GPP access, ignore the release indication in the service request message or the registration request message.

5. A method performed by a user equipment (UE) in a wireless communication system, the method comprising:

transmitting a service request message or a registration request message to an access and mobility management function (AMF) over 3GPP access or non-3GPP access, wherein the service request message or the registration request message does not include paging restriction information, wherein, in case that the service request message without the paging restriction information or the registration request message without the paging restriction information is transmitted over the 3GPP access, stored paging restriction information regarding context of the UE is removed at the AMF, and wherein, in case that the service request message without the paging restriction information or the registration request message without the paging restriction information is transmitted over the non-3GPP access, the stored paging restriction information regarding the context of the UE is retained at the AMF.

6. A method performed by an access and mobility management function (AMF), in a wireless communication system, the method comprising:

receiving a service request message or a registration request message from a user equipment (UE) over 3GPP access or non-3GPP access, wherein the service request message or the registration request message does not include paging restriction information; and in case that the service request message without the paging restriction information or the registration request message without the paging restriction information is received over the 3GPP access, removing stored paging restriction information regarding context of the UE; and in case that the service request message without the paging restriction information or the registration request message without the paging restriction information is received over the non-3GPP access, retaining the stored paging restriction information regarding the context of the UE.

7. A method performed by a user equipment (UE), in a wireless communication system, the method comprising:

transmitting a service request message or a registration request message to release from a radio resource control (RRC)-CONNECTED state to access and mobility management function (AMF) over 3GPP access or non-3GPP access, wherein the service request message or the registration request message includes a release indication, wherein, in case that the service request message including the release indication is transmitted over the 3GPP access, access network (AN) release procedure is triggered, wherein, in case that the registration request message including the release indication is transmitted over the 3GPP access, the AN release procedure is triggered after completion of a registration procedure, and wherein, in case that the service request message or the registration request message including the release indication is transmitted over the non-3GPP access, the release indication in the service request message or the registration request message is ignored at the AMF.

8. A method performed by an access and mobility management function (AMF), in a wireless communication system, the method comprising:

receiving a service request message or a registration request message to release from a radio resource control (RRC)-CONNECTED state from a user equipment (UE) over 3GPP access or non-3GPP access, wherein the service request message or the registration request message includes a release indication;

in case that the service request message including the release indication is received over the 3GPP access, triggering access network (AN) release procedure;

in case that the registration request message including the release indication is received over the 3GPP access, triggering the AN release procedure after completion of a registration procedure; and in case that the service request message or the registration request message including the release indication is received over the non-3GPP access, ignoring the release indication in the service request message or the registration request message.

* * * * *